July 13, 1965 R. M. RICK 3,194,353
FAIL-SAFE HYDRAULIC PRESSURE BRAKE APPARATUS FOR MOTOR VEHICLES
Filed Oct. 2, 1962 3 Sheets-Sheet 1

INVENTOR.
RICHARD M. RICK.
BY
Christy Parmelee, & Strickland
ATTORNEYS.

INVENTOR.
RICHARD M. RICK.

ATTORNEYS.

July 13, 1965  R. M. RICK  3,194,353
FAIL-SAFE HYDRAULIC PRESSURE BRAKE APPARATUS FOR MOTOR VEHICLES
Filed Oct. 2, 1962  3 Sheets-Sheet 3

INVENTOR.
RICHARD M. RICK.

BY

ATTORNEYS.

United States Patent Office 3,194,353
Patented July 13, 1965

3,194,353
FAIL-SAFE HYDRAULIC PRESSURE BRAKE
APPARATUS FOR MOTOR VEHICLES
Richard M. Rick, 119 Brownsville Road, Pittsburgh, Pa.
Filed Oct. 2, 1962, Ser. No. 227,800
5 Claims. (Cl. 188—78)

This invention is for a hydraulic brake especially applicable to motor vehicles and is for an improved wheel brake in which actuation of the brake pedal to apply the brake reduces fluid pressure in the wheel cylinders to effect actuation of the brake shoes to braking position.

Hydraulic or fluid pressure brakes used in motor vehicles at the present time are so constructed that actuation of the brake pedal to braking position applies pressure to fluid in a master cylinder and pressure in this cylinder is communicated to brake cylinders in each wheel. Increase of fluid pressure in the wheel brake cylinders moves the brake bands or shoes into frictional engagement with the brake drum of the wheel. It is evident that if a loss of pressure occurs in any part of the system, the braking force will be lost and the brakes will fail.

The present invention is designed to reverse this condition in that the reduction of fluid pressure in the system causes the brakes to be applied to each wheel, so that the vehicle must be stopped if there is a loss of pressure in the fluid system and the brakes are "fail-safe." While brake apparatus has heretofore been proposed to function in this way, the present invention provides a simple, unique and practical brake that can be economically constructed, positive in operation, and wherein parts are readily accessible for inspection and repair.

The invention therefore has for its object to provide an improved fluid brake especially useful for but not restricted to motor vehicles.

It has for a further important object to provide a brake in which motion of the brake shoes is effected through a cam mechanism assisted by relatively light spring action.

A further important object is to provide a brake which is fail-safe if the operating fluid is lost, but which can be released where it is necessary to tow the vehicle or have the wheels rotate if the fluid is lost.

A still further important object is to provide a brake in which the shoes may be easily removed for relining or for access to other parts in the brake drum.

Another object is to provide a brake which may be used as a parking brake, as well as a service brake.

These and other objects and advantages are secured by my invention as will more fully appear in the following detailed description in conjunction with the accompanying drawings, in which.

Figure 2:
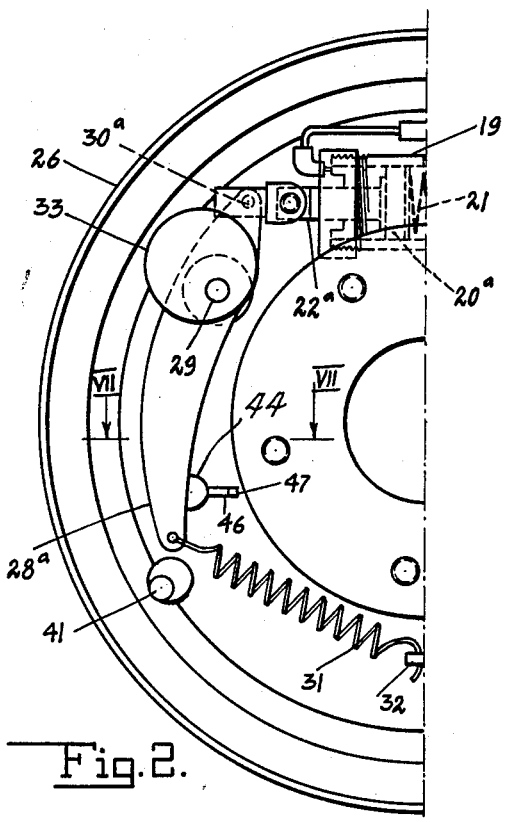
FIG. 2 is a half section in elevation of the stationary supporting plate showing one half of the mechanism with the brake shoes and brake drum removed.
Figure 3:
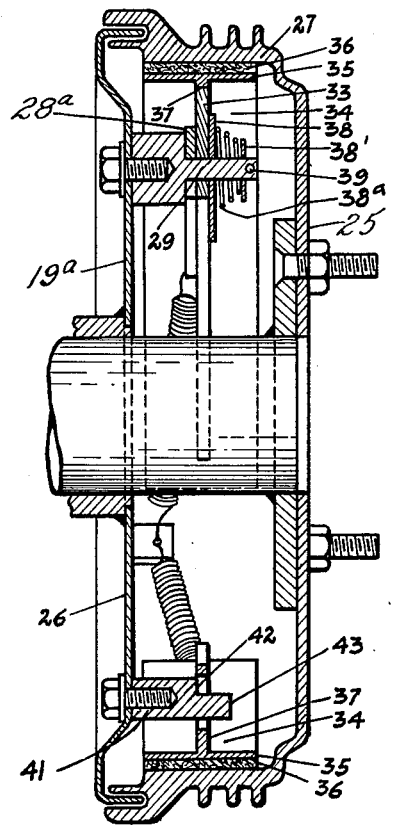
FIG. 3 is a transverse section through the assembly including the brake shoes and brake drum, the view being in the plane of line III—III of FIG. 4.
Figure 1:
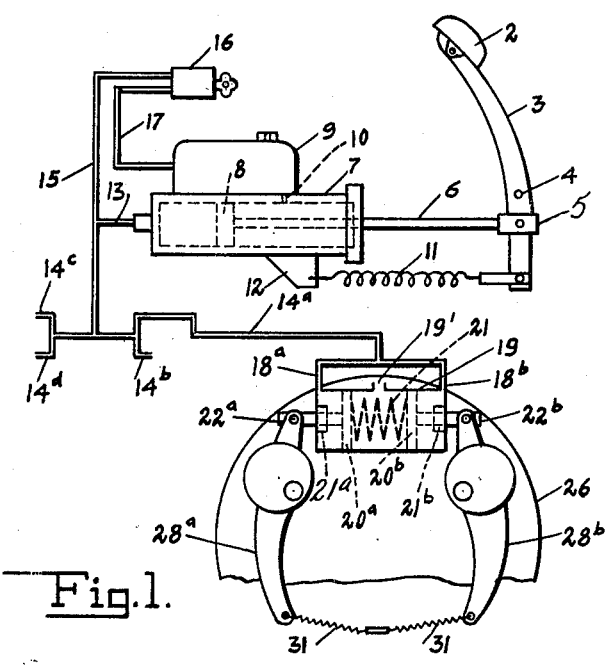
FIG. 1 is a schematic view of the brake system.
Figures 4, 5:
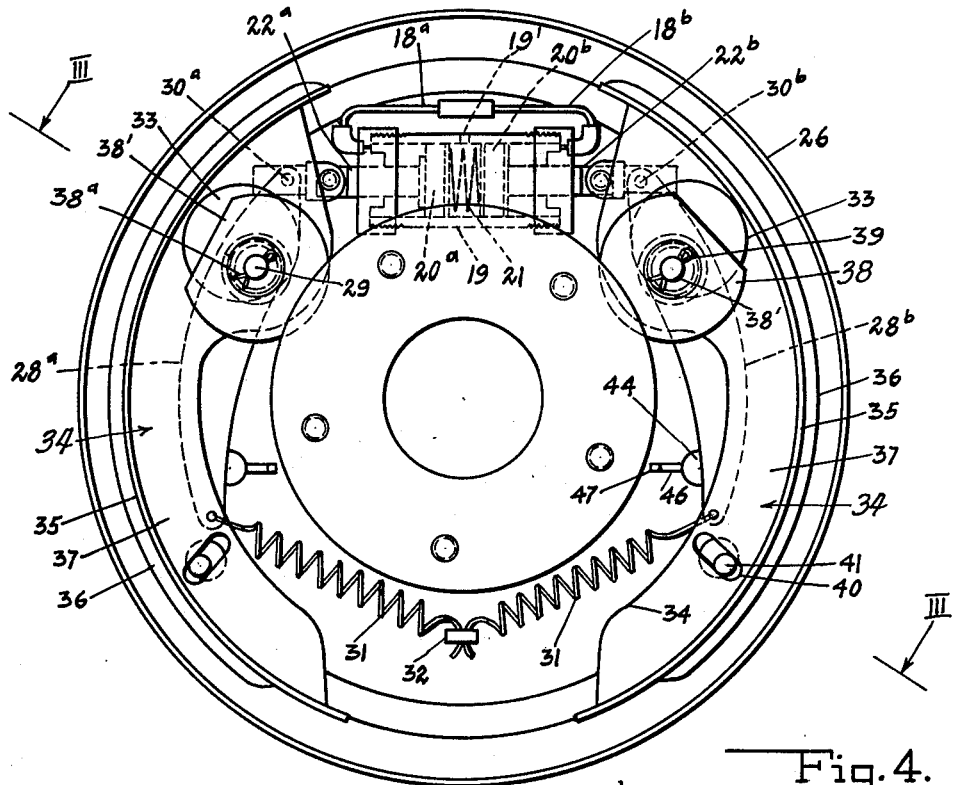
FIG. 4 is a full elevation of the stationary supporting plate shown in FIG. 2 with the brake shoes in position but with the brake drum omitted.
FIG. 5 is an elevation of the assembly shown in FIG. 4 with the brake drum in place, part of the brake drum being shown in section and with the brake shoes contacting the drum.

Referring first to FIG. 1, 2 designates a floor brake pedal like that commonly employed in automobiles. It is on a lever 3 pivotally supported at 4 intermediate the ends of the lever. Attached to the lever 3 below its pivotal axis is a yoke 5 at the end of a piston rod 6. This rod enters one end of a master cylinder 7 and has a piston 8 thereon inside the cylinder. There is a reservoir 9 above the cylinder opening into the cylinder through a port 10. A tension spring 11 has one end attached to the lower end of the pedal lever and its other end anchored to a fixed anchor point, here indicated as a lug 12 on the under side of the master cylinder.

In the diagram shown in FIG. 1, a pipe 13 leads from the opposite end of the cylinder, and this in turn divides into four branches 14a, 14b, 14c and 14d leading to each of the four wheel brakes of a four wheel automobile. There is a by-pass circuit or system of pipes comprising pipe 15 leading from pipe 13 through a valve, preferably a key locked valve 16, located on the vehicle dash, and thence through pipe 17 back to the reservoir 9.

Since the brake mechanism for all four wheels is the same, the diagram is completed only for one, but this arrangement would be provided at the terminal of each of the other branch pipes. The pipe 14a has branches 18a and 18b leading into opposite ends of a cylinder 19 fixed on the face of a stationary supporting disk 26 at the hub of the vehicle wheel. There are confronting pistons 20a and 20b in this cylinder between which there may be a compression spring 21, although this is not necessary. There is a vent 19' at the center of the cylinder 19 open to the atmosphere. Each piston has its own piston rod 22a and 22b, respectively, these extending from opposite ends of the cylinder 19, the cylinder having seals of any well known suitable type through which the rods slide, these being generally indicated at 21a and 21b, respectively.

In operation the key locked valve 16 is normally closed when the automobile is being driven.

Assuming the parts to be in the position shown in the diagram and the key locked valve 16 is closed, pressure of the operator's foot on the brake pedal pulls the piston 8 to the right as viewed in FIG. 1, enlarging the space in the cylinder to the left of the piston 8. This reduces the pressure in both ends of the wheel brake cylinder 19, whereupon the pistons 20a and 20b move in opposite directions away from each other under the pressure of spring 21, if such spring is provided and by reason of the tension of springs 31 hereinafter described. This operation applies the brakes, as will be hereinafter fully described. When the operator releases foot pressure on the brake pedal, spring 11 moves the pedal to its normal position, moving the piston 8 to the left, thereby forcing fluid from the master cylinder into opposite ends of each cylinder 19, driving the pistons 20a and 20b toward each other, expelling air through vent 19'. This movement of the pistons 20a and 20b releases the brakes, as will also hereinafter be fully explained.

The reservoir 9 has a small vent in the top open to atmosphere and the port 10 is located to the right of the normal range of travel of the piston 8 in the master cylinder. With the key valve 16 closed, liquid behind the piston 8 as it moves to the right is forced into the reservoir. The spring 11 therefore keeps the liquid in the brake system under sufficient pressure to release the brakes. If however the key valve 16 is opened, this pressure in the brake system is relieved and the reduction in pressure will set the brakes. Movement of the brake pedal will then merely circulate fluid from one end of the master cylinder to the other without building up pressure in the wheel brake cylinders 19 sufficient to release the brakes. Therefore if the valve 16 is locked in the open position, the brakes cannot be released by operation of the pedal.

There is thus provided by this shunt or bypass system with valve 16 a parking brake that is set merely by turning the key to valve opening position, and the car cannot be stolen as long as this valve remains locked in the open position with the key removed. Also, if the car gets out of control going down a long grade, this key valve may be turned to open position to apply the brakes.

The motion of the pistons 20a and 20b away from each other is utilized to apply the brake, and the motion of them toward each other releases the brake. The organization in each wheel through which this is accomplished is an important part of this invention. The remaining figures of the drawings disclose the actual brake mechanism at each wheel. The brake includes the usual hub assembly comprising a drum 25 attached to a forming part of the wheel itself and which rotates with the wheel. There is the usual fixed supporting plate 26 secured to the axle housing, so that it may not rotate. The drum has a rim 27 that extends inwardly from the wheel over a flange at the rim of the plate 26 so that there is an enclosed chamber in the hub provided by the drum 25, its rim 27 and fixed plate 26 in which the brake mechanism is received.

The cylinder 19 is mounted on the plate 26 inside this chamber near the top of the plate and is centered above the axis of rotation of the wheel, preferably with the cylinder axis horizontal. There are two "mirror image" lever 28a and 28b pivoted at points 29 on the supporting plate, one extending substantially vertically down each side of the center of the hub, each being slightly crescent-shaped to adapt its length to the interior of the chamber inside the drum. The upper end of lever 28a is pivotally connected at 30a to piston rod 22a, and the upper end of lever 28b is pivotally connected at 30b with piston rod 22b. The lower end of each of these levers has a tension spring 31 attached thereto, each spring being anchored to the fixed plate at 32. These springs are always under slight tension, tending to pull the respective pistons 20a and 20b away from each other. If there is also an internal spring 21, the action of the springs 31 is supplemented by the internal spring.

Each of the levers 28a and 28b has a circular cam 33 carried thereon at one side thereof the cam being eccentric to the pivotal mounting 29 about which its lever rotates. There are two brake shoes designated 34 inside the drum, these also being mirror images, and one will be described in detail. It comprises a rim portion 35 curved about a radius corresponding to the interior diameter of the brake drum. On its outer surface is a replaceable friction band 36 like conventional brake lining now used. On its inner face there is a web 37 that is in the plane of the cam 33, and the web has a circular opening therein in which the cam has a close working fit. The shoe is preferably formed as an integral casting.

The pivot post 29 projects beyond the eccentric disk and to hold the parts in place there are washers 38 and 38', a spring 39' and a cotter pin 39. This assembly retains the web of the shoe on the eccentric, and to remove the shoe for inspection or repair, one needs only to remove the cotter pin, the spring and washers, and then pull the shoe outward toward him.

The web 37 is substantially coextensive with the arcuate length of the shoe. The opening that fits about the cam 33 is near the upper end of the shoe. Near the lower end of the shoe the web has a downwardly and outwardly-inclined slot 40 therein. A guide pin 41 on the supporting disk has a shoulder 42 thereon bearing against the inner face of the web and a stud 43 that passes through this slot. This provides a pin about which the lower end of the shoe can move when the cam 33 is rotated, and a guide on which the lower end of the shoe can slide. Also, by setting this pin, with its eccentric stud in the correct angular relation, a limited adjustment of the shoe relative to the drum is provided. The setting of the pin with its eccentric stud is usually made only in the initial assembly of the brake, and needs rarely to be changed thereafter. With this downward and outward movement of the brake shoes, full contact is made between the brake lining and the drum.

Figure 7:
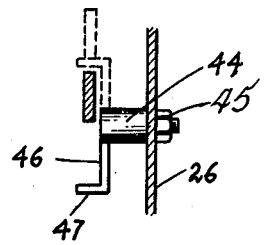
FIG. 7 is a fragmentary detail view showing an emergency brake release pin, the view being a section in the plane of line VII—VII of FIG. 2.

Another pin 44 is carried on the fixed supporting plate for each lever 28a and 28b (see FIG. 7). A nut 45 on the outside of the plate screwed onto the end of this pin holds it from turning. The pin inside the drum has an arm 46 with an abutment 47 thereon. Normally this abutment is clear of the end of the lever 28a or 28b. However, since the brake shoes lock against the drum when the fluid pressure fails, the wheels could not turn for towing or servicing the car when this happened. In this case a mechanic loosens lock nut 45 and turns the pin 44 through an arc of about 180° so that the abutment 47 contacts the lever 28a or 28b as the case may be, and swings it outwardly against the tension of the spring 31. This rotates the cam 33 in the same direction as it would be rotated by fluid pressure to release the brake. The use of these pins, two of which are provided in each wheel, is intended to be made only by a mechanic to release the fail-safe brakes when, because of loss of brake fluid, the brakes have set.

In operation, the pistons 20a and 20b each have a very short stroke, normally little more perhaps than a quarter of an inch. When the driver of the car steps on the brake pedal to apply the brake, pressure in the brake cylinder of each wheel is reduced and the internal springs 31 together with spring 21 cause the pistons 20a and 20b to move apart as above explained, rocking the levers 28a and 28b, rotating their respective cams 33 through a slight arc, which, however, is sufficient to move the brake lining on the brake shoes against the inside of the brake drum. The thrust of the cams moves the shoes downwardly and outwardly so that the mounting of the lower end of each shoe on the guide pin 41 allows this motion of the shoe to be effected and also allows the shoe to pivot slightly. When the shoe contacts the rotating brake drum, the drum tends to pull the shoes into tighter engagement with the drum, and full contact is made between the concentric surface of the brake shoe lining and the brake drum.

When foot pressure is released from the brake pedal, fluid pressure is increased in the wheel brake cylinder and the operation of the parts is reversed to release the brake. If, when the brake is applied, the hand valve 16 is turned to open the bypass from the pipes 13 and 15 to pipe 17 and the reservoir 9, the brakes will remain set and cannot be released until this valve is again closed, all as hereinbefore explained. In this way one set of brakes provides both for a service brake and a parking brake.

The brake is here shown in a direct fluid pressure brake system, but it can be adapted, as will be well understood by those skilled in the art, to power brakes. The invention involves no change of structure in the wheels, hub assembly or brake drums from the structures now used. The parts are of simple construction, easily installed and adjusted. The leverages applied through the rotating eccentric cams are positive, although the actual movement of the parts is small and the spring 11 does not need to be so heavy as to render operation of the brake pedal difficult.

Figure 6:
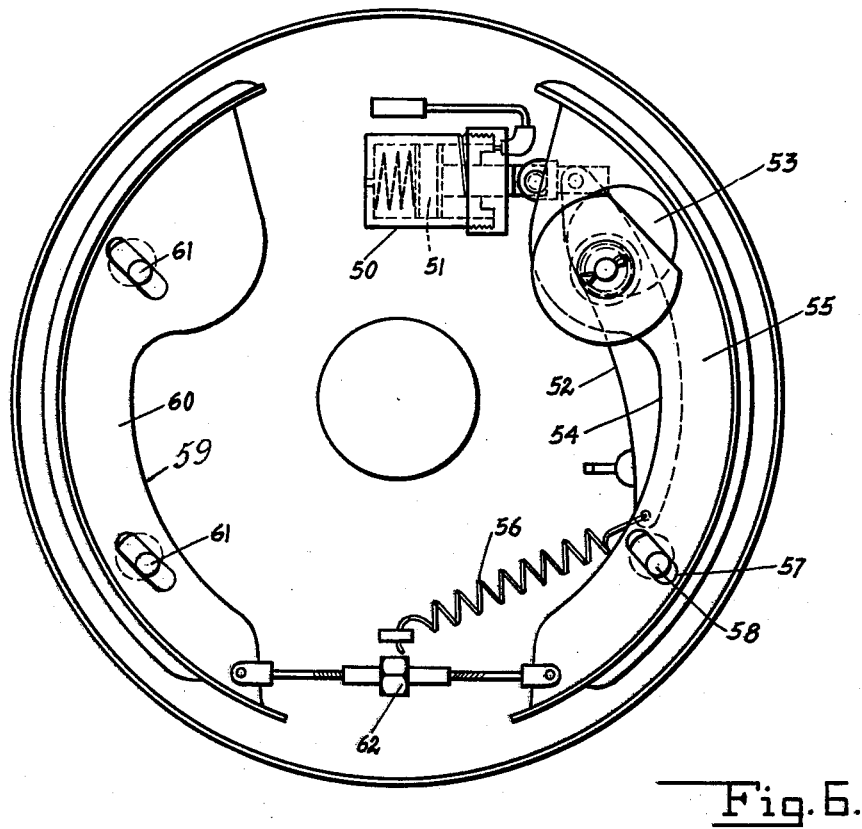
FIG. 6 is a view similar to FIG. 4 showing a modified construction.

In the modification shown in FIG. 6, I have shown an assembly wherein the cylinder 19 with two pistons is replaced by a single cylinder 50 having a piston and a piston rod 51. The piston rod is connected at its outer end to the upper end of a lever 52 similar to one of the levers 28a or 28b. There is a cam 53 on this lever fitted into an opening in the web 54 of a brake shoe 55 similar to that previously described. A tension spring 56 is attached to the lower end of lever 56 and anchored to the fixed supporting plate. The web of the brake shoe has a downwardly and outwardly-sloped slot 57 therein in which is slidably fitted the stud or guide pin 58 similar to 43. In other words, half of the assembly is generally similar to half the assembly previously described. This is effected by reason of a thrust exerted from the brake shoe 55 through link 62 to the lower end of shoe 59. By reason of the two diagonal slots and the pin 61, the thrust causes the shoe to move upwardly and outwardly to apply the brakes. When the brakes are released the link 62 exerts a pull on the shoe 59 to accomplish its reverse movement.

However, the second brake shoe 59 has in its web 60 two spaced slots like slot 57 that slope upwardly and outwardly, and in each of these slots is a guide pin 61 that is on the fixed mounting plate. The lower end of brake shoe 55 is connected with the lower end of the brake shoe 59 through an adjustable link or turnbuckle 62. Thus, when brake shoe 55 is forced downwardly and outwardly, brake shoe 59 is forced upwardly and outwardly.

While the arrangement first described is preferable, the modification may be used as an alternative especially in light, economy cars. The preferred arrangement, however, gives double safety because both shoes move independently, and should one fail for any reason, the other will still provide effective braking power.

The invention is especially useful for motor vehicles, but it may be used for any apparatus to which fluid brakes using a rotating brake drum and a cooperating brake shoe is employed.

While I have shown and described a specific embodiment of my invention, it will be understood that this is illustrative and that various changes may be made in the construction and arrangement of parts within the spirit of my invention and under the scope of the following claims.

What is claimed is:

1. A fluid pressure brake system comprising a master cylinder, a wheel brake cylinder, a pipe connecting the master cylinder and the brake cylinder, a piston in the master cylinder, an operating member connected with the piston in the master cylinder manually movable from a normal position to a braking position, the operating member serving to move the piston in a direction to draw fluid from the wheel brake cylinder into the master cylinder when it moves from normal to braking position, a spring for returning the operating member from a braking position to the normal position, a piston in the wheel brake cylinder, a fixed supporting plate on which the wheel brake cylinder is mounted, a brake drum rotatable with respect to the mounting plate, a lever inside the brake drum pivotally supported between its ends on the mounting plate, one end of said lever being connected with said piston, a spring connected to the opposite end of the lever and to the mounting plate, the spring acting in opposition to the piston, an eccentric cam comprising a circular disc mounted on the lever eccentric to its pivot axis to rotate with the lever, a brake shoe within the brake drum having a circular opening therein in which the circular cam is fitted whereby rotation of the cam exerts a combined radial and rectilinear movement to the shoe, and a guide pin on the supporting plate passing through the shoe in spaced relation to the cam, the shoe having a diagonal slot therein through which the pin is passed for guiding the movement of the shoe toward and away from the brake drum.

2. A fluid pressure brake system as defined in claim 1 wherein there is a by-pass around the piston of the master cylinder, the by-pass having a valve selectively movable to open or closed position whereby with said valve in the open position the operation of the piston is ineffective to generate pressure in the wheel brake cylinder.

3. A wheel brake comprising a fixed supporting plate, a rotary brake drum with a brake drum flange, a brake shoe inside the drum having a curved braking surface confronting the inside of the drum flange, said shoe having a web portion with an opening therein, a cam fitted in the opening, a lever on which the cam is fixed, a fluid pressure piston and cylinder on the supporting plate for moving the lever in one direction, said brake shoe web also having a slot therein diagonal to the radius of curvature of the shoe and spaced from said cam, and a pin on the supporting plate engaged in said slot for guiding the movement of the shoe toward and away from the brake drum flange.

4. A wheel brake comprising a fixed supporting plate, a rotary brake drum with a brake drum flange, a brake shoe inside the drum having a curved braking surface confronting the inside of the drum flange, said shoe having a web portion with a circular opening therein, a cam fitted in the opening, a lever on which the cam is fixed, a fluid pressure means having a movable piston and cylinder fixed on the supporting plate for moving the lever in one direction, said lever being pivotally supported on the supporting plate intermediate its ends with the piston connected to one end of the lever, a spring acting in opposition to the piston connected to the other end of the lever and to the supporting plate, the cam comprising a circular disk mounted on the lever at one side thereof but eccentric to the axis about which the lever pivots and adjustable means accessible at the opposite side of said supporting plate for restraining said lever against movement under the action of said spring for emergency use in holding the brake shoe out of braking position.

5. A wheel brake comprising a supporting plate, a brake drum having a brake drum flange confronting the supporting plate, a shaft on which the drum is carried and relative to which the plate is fixed, a cylinder on the supporting plate having opposed pistons therein with a vent in the cylinder between the pistons, a fluid pressure connection at each end of the cylinder through which fluid pressure can be exerted to move the pistons toward each other, each piston having a piston rod attached thereto, a lever at each side of the axis of said shaft each pivotally mounted between its ends on the supporting plate, one end of each lever being connected with one of said piston rods, a spring anchored to the supporting plate attached to the other end of each lever for yieldably opposing movement of the levers by fluid pressure acting on the pistons, a circular cam on each lever positioned over the pivotal mounting for the lever on which it is carried but eccentric to such pivot, and a pair of brake shoes within the drum, each brake shoe having a circular opening in which one of said cams has a working fit and having a curved braking surface concentric with and confronting the brake drum flange, said cams being so set that movement of the opposing pistons away from each other moves the braking surface of the shoes away from the brake drum flange and movement of the pistons toward each other moves the shoes into engagement with the brake drum flange.

References Cited by the Examiner
UNITED STATES PATENTS

| | | | |
|---|---|---|---|
| 1,781,993 | 11/30 | Wieczorek | 188—152.8 |
| 2,126,849 | 8/38 | Weiss | 188—170 |
| 2,320,585 | 6/43 | Gill et al. | 188—112 |

ARTHUR L. LA POINT, *Primary Examiner.*